April 3, 1934.  R. DOWSON  1,953,064
CENTRIFUGAL APPARATUS SUCH AS FANS, IMPELLERS, AND THE LIKE
Filed Dec. 7, 1932  3 Sheets-Sheet 1

INVENTOR
Robert Dowson

April 3, 1934.   R. DOWSON   1,953,064
CENTRIFUGAL APPARATUS SUCH AS FANS, IMPELLERS, AND THE LIKE
Filed Dec. 7, 1932   3 Sheets-Sheet 2
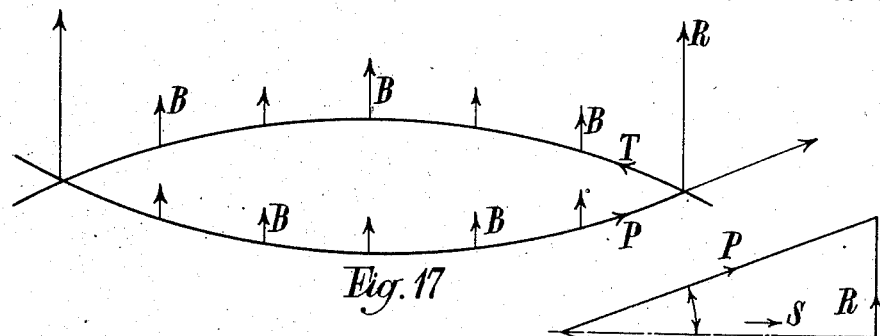
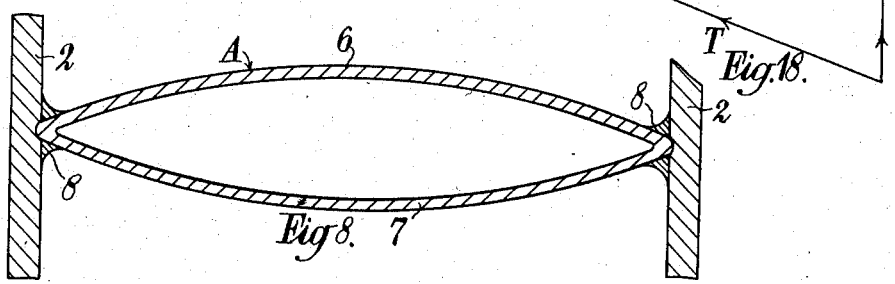
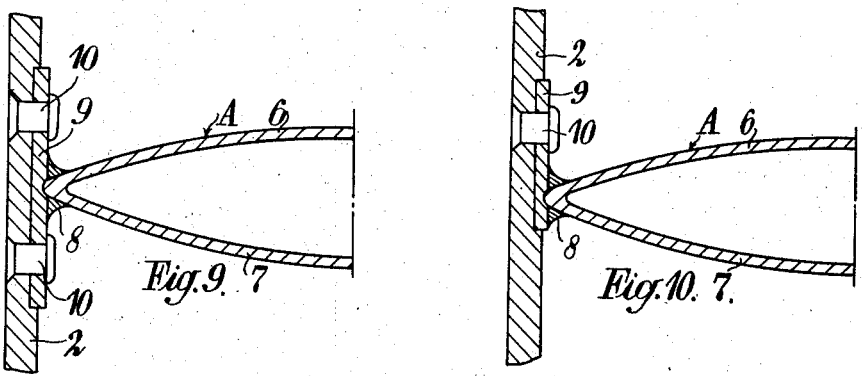
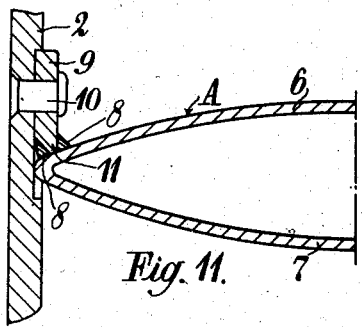
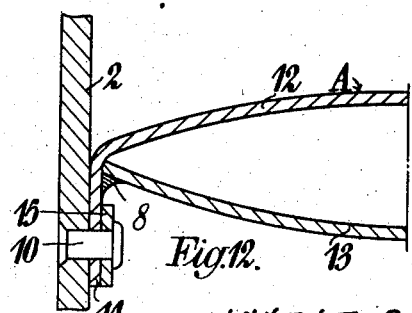
INVENTOR
Robert Dowson
BY

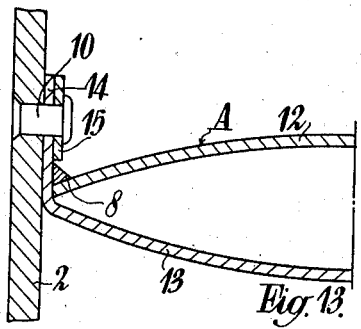
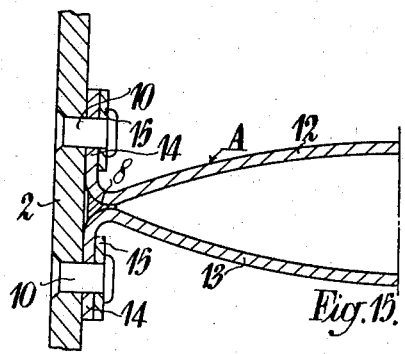
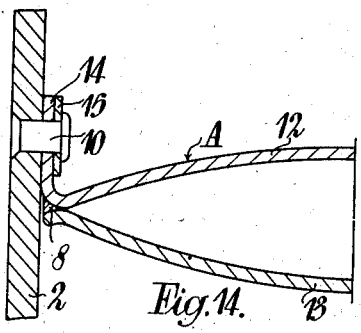
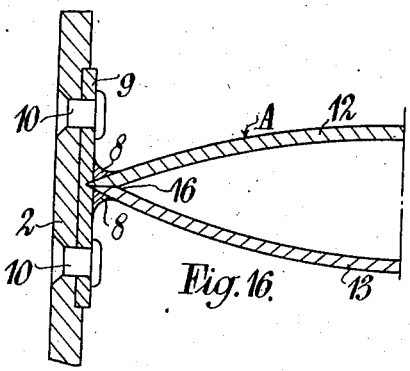
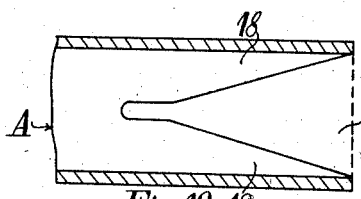
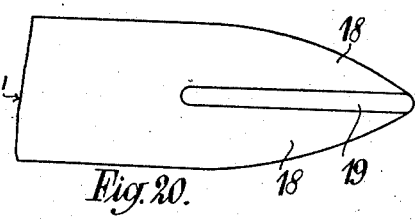
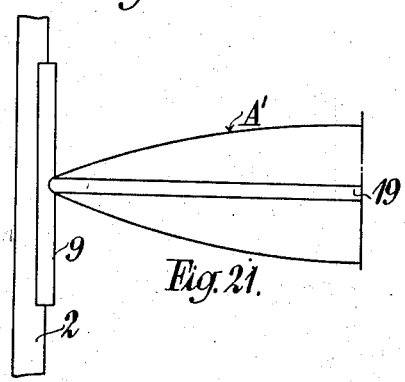
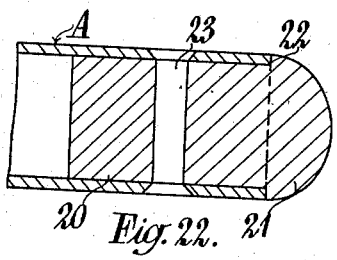

Patented Apr. 3, 1934

1,953,064

UNITED STATES PATENT OFFICE 1,953,064

CENTRIFUGAL APPARATUS SUCH AS FANS, IMPELLERS, AND THE LIKE

Robert Dowson, Newcastle-on-Tyne, England, assignor to C. A. Parsons & Company, Limited, Newcastle-on-Tyne, England Application December 7, 1932, Serial No. 646,039
In Great Britain December 19, 1931

4 Claims. (Cl. 103—115)

The invention relates to centrifugal apparatus such as fans, impellers and the like and particularly to those of the kind having blades running at an angle to the radius.

When the blades are secured between lateral plates or discs, centrifugal force acting on the blades may cause distorting forces to be transmitted to the lateral plates or discs, and a main object of the present invention is to minimize or eliminate such distorting forces so that the lateral plates or discs may be made lighter than heretofore and not require stiffening members.

With such a main object, the present invention consists in centrifugal apparatus of the kind in question comprising the combinations of elements hereinafter set forth and particularly pointed out in the claims.

The invention finally consists in the improved centrifugal apparatus and blades therefor to be hereinafter described.

Referring to the accompanying diagrammatic drawings:

Figure 8 shows a cross-section of a blade secured to its side plates, in which the blade takes the form of a flattened tube;

Figures 9, 10 and 11 are similar views showing one half only of a blade fastened in different ways to its side plates by way of a plate recessed thereinto;

Figures 12, 13 and 14 show similar half views of different forms of tubular blade built up of opposed catenary members, one of which is flanged;

Figure 15 shows a half view of a built-up blade in which both members are flanged and Figure 16 a half view of a built-up blade in which the bevelled edges of the two catenary members are juxtaposed;

Figures 17 and 18 are diagrams showing the action of the forces to which the tubular blades in accordance with this invention are subjected;

Figure 19 shows in section a view of a tubular blade with a V of metal removed to provide jaws and Figure 20 an outside view of a tube so treated with the jaws closed and welded together;

Figure 21 shows a half-end view of such a closed tube secured in place; while finally Figure 22 shows a sectional view of a plug form of closure for a tubular blade.

Where desirable, the same reference symbols are used in the different figures to denote corresponding parts.

Figure 1:
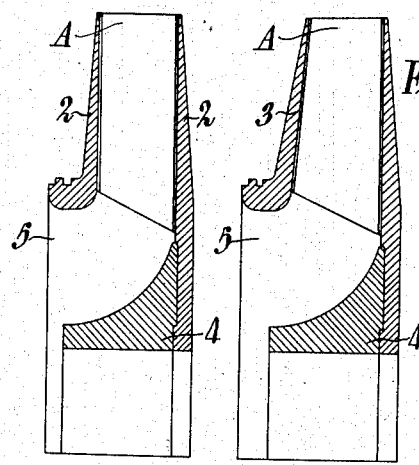
Figure 1 shows in longitudinal section one half of a fan or impeller in which the adjacent faces of the side plates are both parallel, Figure 2 showing a similar view of a modified form in which one of the side plates is conical.

In carrying the invention into effect as applied to a centrifugal air fan, the general structure consists of side plates of plane form, 2, 2, (see Figure 1) or conical form, 3, (see Figure 2) mounted in any suitable manner on a central hub, 4, the air entering axially through an annulus, 5, and disposed between these plates and secured to them, a number of blades, A, spaced apart and running at an angle to the radius, examples of such blades being shown in situ, in Figures 3 to 7, and described in detail hereinafter.

According to one form of the invention, (see Figure 8) each blade consists of an integral tube, A, flattened to produce a substantially fish-like cross-section as shown, the two bounding walls, 6 and 7, having the form of oppositely-disposed catenaries or approximations thereto.

Such a blade is arranged between the side plates, 2, 2, and according to one form is secured in place by welding, 8, with the major axis of the cross-section lying parallel to the axis of rotation of the fan.

According to another form, (see Figure 9), the flattened tube, A, instead of being welded directly to the side plates, is welded to one face of a fixing plate, 9, along its centre line, this plate being recessed into its side plate, 2, and secured thereto by two lines of rivets, 10, 10.

Figure 3:
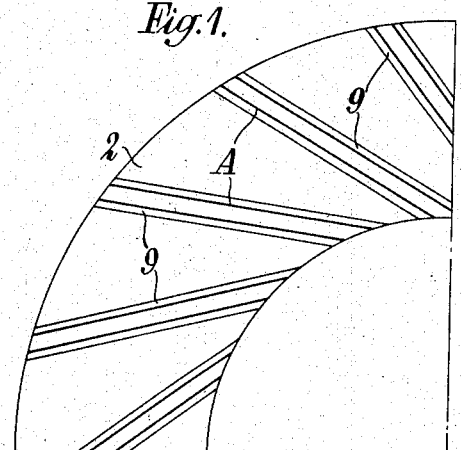
Figure 4:
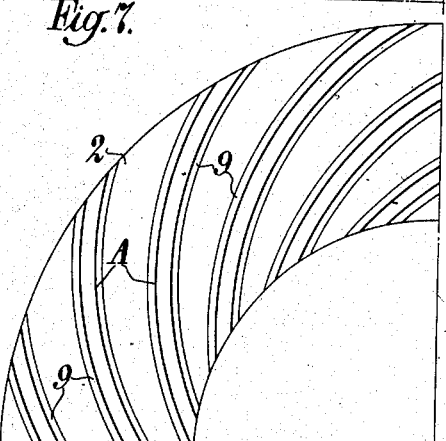

The blades described with reference to Figure 9, as in other forms of the invention, may be either straight, as shown in Figure 3, or curved as shown in Figure 4.

In the form shown in Figure 10, the tube, A, is welded to a face of the plate, 9, near one edge thereof, the plate being attached to its side plate, 2, by a line of rivets, 10, extending along the opposite edge.

According to a modified form of this construction, (see Figure 11) the tube, A, is secured by two lines of welding, 8, 8, to the chamfered edge, 11, of the plate, 9.

Instead of using integral tubes, A, each blade may be built up of two members, 12, 13, one of which is provided with a flange, 14.

Thus in Figure 12, the member, 12, is provided with a flange, 14, bent in a direction towards the member, 13, the two parts being welded together at 8, while the flange, 14, is secured to its side plate, 2, by a line of rivets, with or without an interposed washer plate, 15.

In Figure 13, the structure is similar to that just described, but the flange, 14, forms part of the member, 13.

In Figure 14, the member, 12, is shown with a flange, 12, as in Figure 12, but in this case, the flange turns away from the second member, 13, while in Figure 15, each member, 12 and 13, is provided with a turned-away flange, 14, secured by rivets, 10, to its side plate, 2.

Finally, in Figure 16, a structure is shown, in which the two members, 12 and 13, are provided with bevelled edges juxtaposed as at 16, and welded to a fixing plate, 9, secured to its side plate in the manner already described with reference to Figure 9.

It will be seen that with such a tubular blade, (see Figure 17) centrifugal force, represented by the arrows, B, imposes a tensional stress, T, on one member of the blade and a compressional stress, P, on the other, these forces balancing out as regards any tendency to pull the side plates, 2, together or force them apart, so that the only forces acting at the junctions of the two members, 6 and 7, or 12 and 13, of a tube is the shearing forces, S, shown in Figure 18, and the only forces communicating centrifugal load to the supporting plates, 2, are the forces, R, tending to shear through the rivets, 10, or other attachments, of the blades to the side plates.

In general, there is no disadvantage in the use of hollow blades as described, some portion of the air passing through them in an outward direction, but in some cases, they may be closed at one or both ends.

For example, referring to Figure 19, a V, 17, is cut in one or both ends of a tube, A, and the two jaws, 18, 18, so formed, are forced together (see Figure 20) and welded along the line of junction, 19, the resulting tube, $A^1$, with closed ends, being secured, for example, by welding to fixing plates, 9, recessed into the side plates, 2, as described in relation to Figure 9.

Figures 5, 6:
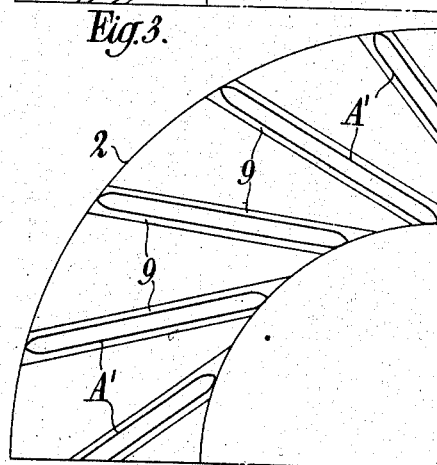

Closed blades, $A^1$, so formed may be either straight as shown in Figure 5 or curved as shown in Figure 6.

According to an alternative method, (see Figure 22) of closing a tube, such as A, a plug is provided having a body, 20, and a rounded head, 21, with a shoulder, 22; such a plug, preferably of a light material such as aluminium, and suitably shaped to fit, is merely inserted in the open end of the tube, A, and secured in place, e. g., by a transverse rivet, 23.

Figures 2, 7:
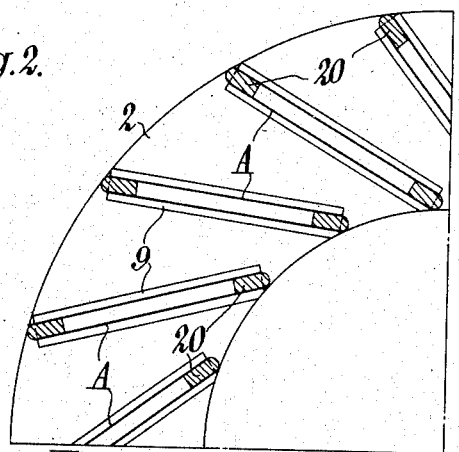
Figures 3, 4, 5, 6 and 7, show views of a quadrant of the blade assembly of the fan or the like with different types of straight and curved blades as described in detail with reference to certain of the following figures.

Such a closed tube is shown in situ in Figure 7.

By virtue of the present invention, in the preferred forms as described above, the following advantages are secured:—

(a) The forces tending to distort the side plates being very small, the side plates may be made thinner and the gland or packing at the eye of the impeller operated with finer clearances.

(b) The rivets, welds or other forms of attachments by which the blades are secured to the side plates are exposed to only simple shear stresses.

(c) Extra rigidity of the structure is secured without the addition of struts or like stiffeners that would impose an additional dead weight on the plates.

(d) Bending stresses in the blades themselves are eliminated, the curved sides being subject to only direct tension and compression, resulting in simple shear along the junction lines.

If special lightness is required, a metal such as duralumin may be used instead of the usual steel.

It will be understood that variations may be made from the typical structures above described, for example, in respect of the precise shape of the blades and the method of attaching them to their carrying members, without exceeding the scope of the invention as defined in the claims appendant to this specification.

I claim:

1. The combination in centrifugal bladed apparatus rotatable about an axis, of a series of blades running oblique to the radius as seen in an end view of the apparatus together with means for supporting said blades and laterally disposed thereof, said blades comprising associated pairs of plates with edges juxtaposed in the neighborhood of said supporting means, said plates being respectively convexed in opposite directions as cut by planes through said axis of rotation so that they are spaced apart at varying distances at points intermediate said edges.

2. The combination claimed in claim 1, in which each pair of oppositely-convexed plates forms a seamless flattened tube and said laterally-disposed means support, said tubes along the regions thereof lying at the ends of their greater diameters.

3. The combination claimed in claim 1, in which each pair of oppositely-convexed plates is welded together to form a flattened tube and said laterally-disposed means support said tubes along the regions thereof lying at the ends of their greater diameter.

4. The combination claimed in claim 1, in which each pair of oppositely-convexed plates is united to form a flattened tube self-contained as regards the action of centrifugal force thereon and said laterally-disposed means support said tubes by means submitted to only simple shearing forces.

ROBERT DOWSON.